(12) United States Patent
Costa et al.

(10) Patent No.: US 10,377,853 B2
(45) Date of Patent: *Aug. 13, 2019

(54) PROCESS TO PREPARE A POLYESTER POLYMER COMPOSITION COMPRISING A POLYESTER POLYMER HAVING FURANIC UNITS AND A POLYESTER POLYMER COMPOSITION OBTAINABLE THEREBY AND THE USE THEREOF

(71) Applicant: Sulzer Chemtech AG, Winterthur (CH)

(72) Inventors: Liborio Ivano Costa, Winterthur (CH); Philip Nising, Detwil am See (CH); Francesca Tancini, Wettingen (CH); David Pfister, Zürich (CH); Giuseppe Storti, Zürich (CH); Massimo Morbidelli, Zürich (CH)

(73) Assignee: Sulzer Chemtech AG, Winterthur (CH)

(*) Notice: Subject to any disclaimer, the term of this patent is extended or adjusted under 35 U.S.C. 154(b) by 11 days.

This patent is subject to a terminal disclaimer.

(21) Appl. No.: 15/478,984

(22) Filed: Apr. 4, 2017

(65) Prior Publication Data

US 2017/0267812 A1  Sep. 21, 2017

Related U.S. Application Data

(62) Division of application No. 14/772,477, filed as application No. PCT/EP2013/074882 on Nov. 27, 2013, now abandoned.

(30) Foreign Application Priority Data

Mar. 15, 2013  (EP) .................... 13159394

(51) Int. Cl.

| | | |
|---|---|---|
| *C08G 63/78* | (2006.01) |
| *C08G 63/181* | (2006.01) |
| *B29C 48/00* | (2019.01) |
| *C08G 63/83* | (2006.01) |
| *C08G 63/84* | (2006.01) |
| *C08G 63/85* | (2006.01) |
| *C08L 67/02* | (2006.01) |
| *B29C 45/00* | (2006.01) |
| *B29C 49/00* | (2006.01) |
| *C08G 63/91* | (2006.01) |
| *B29K 67/00* | (2006.01) |

(52) U.S. Cl.
CPC .......... *C08G 63/78* (2013.01); *B29C 45/0001* (2013.01); *B29C 48/022* (2019.02); *B29C 49/0005* (2013.01); *C08G 63/181* (2013.01); *C08G 63/83* (2013.01); *C08G 63/84* (2013.01); *C08G 63/85* (2013.01); *C08G 63/916* (2013.01); *C08L 67/02* (2013.01); *B29K 2067/00* (2013.01)

(58) Field of Classification Search
CPC ...... C08G 63/181; C08G 63/78; C08G 63/83; C08G 63/84; C08G 63/85; C08G 63/916; C08L 67/02

See application file for complete search history.

(56) References Cited

U.S. PATENT DOCUMENTS

| | | | |
|---|---|---|---|
| 2,551,731 A | 5/1951 | Drewitt et al. | |
| 4,314,606 A | 2/1982 | Müller et al. | |
| 8,143,355 B2 | 3/2012 | Matsuda et al. | |
| 9,725,558 B2* | 8/2017 | Costa | C08G 63/181 |
| 2007/0137488 A1 | 6/2007 | Streiff | |
| 2008/0219086 A1 | 9/2008 | Mathys et al. | |
| 2009/0124763 A1 | 5/2009 | Matsuda et al. | |
| 2010/0174044 A1 | 7/2010 | Eritate | |
| 2011/0263799 A1* | 10/2011 | Haan | C08G 63/785 |
| | | | 526/64 |
| 2011/0282020 A1 | 11/2011 | Sipo | |
| 2013/0171397 A1 | 7/2013 | Ghosh et al. | |

FOREIGN PATENT DOCUMENTS

| | | |
|---|---|---|
| KR | 10-2012-0107573 | 10/2012 |
| RU | 2606515 C2 | 1/2017 |
| WO | 2010/012770 A1 | 2/2010 |
| WO | 2010/077133 A1 | 7/2010 |
| WO | 2013/062408 A1 | 5/2013 |

OTHER PUBLICATIONS

Brunelle, Daniel J. "Semicrystalline Polymers via Ring Opening Polymerization: Preparation and Polymerization of Alkylene Phthalate Cyclic Olgiomers" 1998, Macromolecules, pp. 4782-4790, vol. 31.
Burch, R. et al. "Synthesis of Cyclic Oligoesters and Their Rapid Polymerization to High Molecular Weight", Macromolecules, 2000, pp. 5053-5064, vol. 33.
Goodman, et al. The Structures and Reversible Polymerizstion of Cyclic Oligomers from Poly(ethylene terephthalate), Journal of Polymer Science, 1960, pp. 423-433, vol. XLVIII.
Gubbels, E. et al. "Synthesis and Characterization of Novel Renewable Polyester based on 2,5-Furandicarboxylic Acid and 2,3-Butanediol" Journal of Polymer Science, Published online Nov. 19, 2012, pp. 890-898.

(Continued)

*Primary Examiner* — Ling Siu Choi
*Assistant Examiner* — Gennadiy Mesh
(74) *Attorney, Agent, or Firm* — Larson & Anderson, LLC

(57) ABSTRACT

A process to prepare a polyester polymer composition comprising a polyester polymer having furanic units is disclosed. The process comprises a step of ring-opening polymerization of a cyclic polyester oligomer, which comprises residue of furandicarboxylic acid and a diol, in the presence of a catalyst in order to yield a polyester polymer having furanic units. The polyester polymer composition obtainable by the process, wherein the polyester polymer composition comprises a polyester polymer having furanic units and a cyclic polyester oligomer in a concentration of less than 5 wt % of the composition. The use of the polyester polymer composition in extrusion, injection molding, or blow molding are also disclosed.

15 Claims, 9 Drawing Sheets

(56) References Cited

OTHER PUBLICATIONS

Zhu, J. et al. "Poly(butylene 2,5-furan dicarboxylate), a Biobased Alternative to PBT: Synthesis, Physical Properties, and Crystal Structure" Macromolecules, 2013, pp. 796-804.

* cited by examiner

PROCESS TO PREPARE A POLYESTER POLYMER COMPOSITION COMPRISING A POLYESTER POLYMER HAVING FURANIC UNITS AND A POLYESTER POLYMER COMPOSITION OBTAINABLE THEREBY AND THE USE THEREOF

BACKGROUND OF THE INVENTION

The present invention relates to a process to prepare a polyester polymer composition comprising a polyester polymer having furanic units, as well as said polyester polymer composition obtainable by said process and the use of said polyester polymer composition in extrusion, injection molding, or blow molding.

Polyesters are an important class of commercial polymers with useful physical and mechanical properties and numerous applications. Polyesters find wide utility, for example, as fibres, coatings, films, or in composites. Most industrial polyesters such as polyethylene terephtalate (PET), polybutylene terephthalate (PBT), and polyacrylates are produced from monomers derived from petrochemical feedstocks. Due to limited oil reserves, fluctuations of oil price, political instability in some production areas, and increased environmental awareness, there is growing interest for biobased polyesters produced from renewable feedstocks.

Currently, there are only few biobased polyesters in commercial or pilot production. Representative examples of natural occurring polyesters are polyhydroxyalkanoates (PHA), which are linear polyesters produced by microbial fermentation from sugars or lipids. However PHA has not been widely industrialized due to limitations in production yields and downstream processing.

Another example of a commercially-produced biobased semisynthetic polyester is polylactic acid (PLA), which may be prepared from polycondensation of lactic acid or ring-opening polymerization of the cyclic diester lactide. Although PLA has a wide range of applications, it is an aliphatic polyester and therefore not suitable for replacing petrochemical-based aromatic polyesters in applications such as higher temperature extrusion or molding or the production of bottles. Since most biobased building blocks are derived from non-aromatic compounds such as sugars or starch, most biobased polymers suffer this disadvantage. Examples of other such aliphatic biobased polymers include polybutylene succinate (PBS) or polymers based on sebacic or adipic acids.

For these reasons, biobased polymers having aromatic building blocks are highly sought today. An interesting class of biobased aromatic monomers are the furanics such as furan-2,5-dicarboxylic acid (FDA), 5-(hydroxymethyl)furan-2-carboxylic acid (HMFA), and 2,5-bis(hydroxyl methyl)furan (BHMF), which may be prepared from the intermediates furfural (2-furan carboxaldehyde) and 5-hydroxymethyl 2-furan carboxaldehyde (HMF) which may be produced by the acid-catalyzed thermal dehydration of pentoses (C5) and hexoses (C6). The chemical similarity of the furan ring to the phenyl ring makes it possible to replace phenyl-based polymers such as polyethylene terephthalate (PET) by furan-based polymers.

The production of polyesters from furanic building blocks by polycondensation reactions involving heating a mixture of dialcohols and diacids or diesters at high temperatures in the presence of organometallic or acid catalyst is known, for example, from U.S. Pat. Nos. 2,551,731 and 8,143,355 B2. To allow the progress in this equilibrium reaction towards the formation of the polymer, the formed water or side products such as alcohol must be removed, typically by reduced pressure or gas streams at elevated temperatures in the process. Therefore complex and costly reaction and devolatilization equipments effective at driving the reaction to completion, devolatilizing significant amounts of volatile compounds from highly viscous polymer melts, and having the capacity to remove and condense these volatile compounds are required. If the polycondensation and devolatilization is insufficient, then an high molecular weight polyester having useful mechanical and other properties will not be produced.

Furthermore the high temperatures and long residence times used for driving the polymerization and devolatilization lead often to undesired side reactions such as degradation of the monomer, oligomer or polymer, formation of intermolecular bonds leading to branching, and oxidation of the final product with the consequent color development. In addition, significant amounts of volatile organic compounds such as alcohol side products cannot simply be emitted to the atmosphere, and they must be instead recovered for recycling to make new monomer or for thermal recycling. This recovery and recycling to make new monomer entails costly storage and transport aspects unless the polymerization plant is integrated with an on-site monomer production plant.

In conclusion, it would be desirable to have a process to prepare polyesters from furanic building blocks that does not produce large quantities of water or alcoholic side products and that therefore does not require complex reaction and high-capacity devolatilization equipment or harsh high temperature reaction and devolatization steps to drive the polymerization to completion and allow high molecular weight polymers having furanic units to be produced from furanic building blocks.

SUMMARY OF THE INVENTION

Starting from this state of the art, it is an object of the invention to provide a simplified process to prepare a polyester polymer composition comprising a polyester polymer having furanic units and that does not suffer from the previous mentioned deficiencies, particularly a high polymerization reaction time, a tendency to form large quantities of volatile side products such as water or alcohol, which requires complex and costly high-capacity devolatilization systems, especially when producing high molecular weight polyester polymers. A related object is avoid thermal degradation and polymer discoloration due to harsh polymerization and devolatization conditions of high temperatures and long times. Further objects of the invention include providing a polyester polymer composition obtainable by said process and a use of said polyester polymer in extrusion, injection molding, or blow molding.

According to the invention, these objects are achieved by a process to prepare a polyester polymer composition comprising a polyester polymer having furanic units, wherein the process comprises the step of: reacting a cyclic polyester oligomer in the presence of a catalyst in a ring-opening polymerization step under conditions of a reaction temperature and a reaction time sufficient to yield a polyester polymer having furanic units, wherein either (I) the cyclic polyester oligomer comprises the structure:

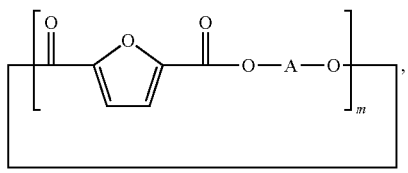

wherein each of the groups A is an optionally-substituted linear, branched or cyclic alkyl, phenyl, aryl, or alkylaryl group, and m is an integer from 1 to 20, preferably 2 to 15, most preferably 3 to 10, and the polyester polymer having furanic units comprises the structure:

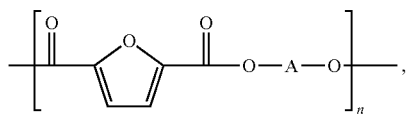

wherein A is as previously defined and n is an integer from 10 to 1,000,000,

OR (II) the cyclic polyester oligomer comprises the structure:

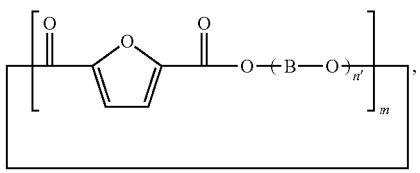

wherein each of the groups B is an optionally-substituted linear, branched or cyclic alkyl, phenyl, aryl, or alkylaryl group, and n' is an integer from 1 to 20, preferably 2 to 10, and m=1 to 20, preferably 2 to 15, most preferably 3 to 10, and m is as previously defined, and the polyester polymer having furanic units comprises the structure:

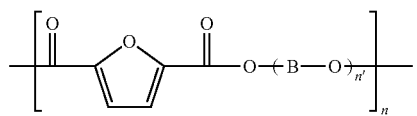

wherein B, n' and n are as previously defined.

According to the invention, these further objects are achieved firstly by a polyester polymer composition obtainable by said process, wherein the polyester polymer composition comprises: a polyester polymer having furanic units and comprising either structure $Z^1$ or $Z^2$, and a cyclic polyester oligomer comprising either structure $Y^1$ or $Y^2$, preferably in a concentration of less than 5, more preferably less than 1, more preferably less than 0.5 wt % in the composition.

Said polyester polymer composition is used in accordance with the invention in extrusion, injection molding, or blow molding.

The present invention achieves these objects and provides a solution to this problem by means of the cyclic polyester oligomer comprising either structure $Y^1$ or $Y^2$. These cyclic oligomers are preferably prepared by condensation reactions carried out to high conversion and with linear impurities removed, and thus they do not contain carboxylic acid or free OH groups, as would monomers such as 2,5-furandicarboxlic acid or ethylene glycol, propanediol or butanediol. Therefore the further reaction of the cyclic oligomers of the invention to form a high molecular weight polymer will not release large amounts of water as do those monomers. These cyclic oligomers also do not contain esters of volatile monofunctional alcohols, as does 2,5-furandicarboxlic acid dimethyl or diethyl ester. Therefore the further reaction of these cyclic oligomers of the invention to form a high molecular weight polymer will not release large amounts of volatile alcohol byproducts as do those monomers.

The lack of production of large quantities of volatile water or alcohol components during the polymerization and any subsequent devolatilization allows simpler devolatilization systems and milder devolatilization conditions to be used as only relatively small amounts of volatile compounds will be present in the polymer composition after polymerization of the cyclic oligomer. In particular, due to its molecular weight, the cyclic oligomer is not very volatile. Furthermore since the cyclic oligomer lacks free acid and/or hydroxyl groups, residual unreacted cyclic oligomer species will not negatively impact the chemical, color, and thermal stability of the polymer composition. Thus due to its design and nature, the cyclic polyester oligomer conveniently allows a high molecular weight polymer to be prepared at relatively mild conditions of time and temperature for both the polymerization reaction and the devolatilization such that significant thermal degradation of the polymer composition may be avoided.

These results are then surprisingly achieved without the need for any special elaborate reaction and devolatilization apparatuses involving the application of vacuum and/or inert gas streams at elevated temperatures over long periods of time. In the present invention the reactions and operations involving the formation of significant volatile species such as water and alcohols have all been conveniently moved upstream to the cyclic polyester oligomer production stage, and thus only relatively small amounts of such volatile species will be generated in the polymerization process. In this manner the removal and recovery and/or recycle of such species is integrated within the oligomer production facility. This then eliminates the need for the transport of such materials between monomer and polymer production plants, which may be geographically quite distant from one another.

In a preferred embodiment of the process, the reaction temperature is from 25 to 350, preferably 80 to 300, most preferably 110 to 280° C., and wherein the reaction time in the ring opening polymerization step is from 10 to 300, preferably, 20 to 240, most preferably 30 to 180 minutes. It has been found that such reaction times and temperatures are sufficient to allow a high molecular weight polymer to be produced but avoid the occurrence of significant thermal degradation leading to undesirable discoloration, chain scission, or branching.

In a specific preferred embodiment of the process, the catalyst is selected from a base, preferably a metal alkoxide, or a Lewis acid catalyst, and the ring-opening polymerization step preferably takes place in the presence of an initiator having at least one or more hydroxyl groups. The use of such catalysts and initiators allows high molecular weight polyester polymer compositions to be prepared under relatively mild conditions of temperature and time. This then improves productivity and minimizes degradation and discoloration in the product.

In more specific preferred embodiment of the process, the catalyst is a Lewis acid catalyst and it is preferably a tin, zinc or aluminium or titanium alkoxide or carboxylate, and the initiator, if present, is selected from the group consisting of water, 1-octanol, 2-ethylhexanol, 1-decanol, isodecyl alcohol, 1-undecanol, 1-dodecanol, 2-methyl-2-propanol, 4-phenyl-2-butanol, 1,3-propandiol, and pentaerytrol. In an even more specific preferred embodiment of the process, the Lewis acid catalyst is tin octoate and the initiator is either 1-octanol or 2-ethylhexanol. Such catalysts and initiators have been found to be particularly effective in the process of the invention.

In a preferred embodiment of the process, the catalyst is present in an amount relative to the mass of the cyclic polyester oligomer of from 1 ppm to 1 mass %, preferably from 10 to 1,000 ppm, more preferably from 50 to 500 ppm. The use of such catalyst loading has been found to allow the ring-opening polymerization to take place under relatively mild conditions of temperature and time while avoiding the catalysis of undesired side reactions during the process. Furthermore contamination is avoided of the polyester polymer composition product by large quantities of unquenched residual catalysts, which may lead to degradation and/or discoloration in subsequent thermal processing such as extrusion or molding. Also an effective balance between catalyst cost and productivity is obtained.

Similarly, in another preferred embodiment of the process, the initiator, if present, it is in an amount of from 1 to 100, preferably from 10 to 50 mmol per kg cyclic polyester oligomer. Such levels lead to a high productivity of the process while minimizing side reactions, contamination of the resulting polyester polymer composition product, and raw material consumption and costs.

In yet another preferred embodiment of the process, the ring-opening polymerization step takes place in a loop reactor and a plug flow reactor, wherein one or both of the reactors are preferably equipped with static mixing elements. In the loop reactor, the added cyclic oligomer and catalyst are intimately mixed with partially polymerised product that is already present in the reactor and pre-polymerized. Alternatively, the cyclic oligomer and the catalyst are premixed in a continuous flow apparatus and the resulting mixture is then fed to the loop reactor. One beneficial result of this is that the rheological behaviour of the reaction mixture only changes gradually within the loop reactor, and this helps controlling the fluid flow within the reactor. Major jumps in viscosity over short distances are avoided and the heat released by the reaction is distributed uniformly in the reactor. Due to the increased flow rate and the mixing elements that are preferably present, the rate of heat removal from the reactor is significantly enhanced, further helping in the control of reaction conditions. More in particular, the combination of high flow rate and mixing elements results in enhanced temperature homogeneity, and thus a more even temperature distribution in the loop reactor. It also results in a narrow residence time distribution. Hot spots are avoided so there is less discoloration of the polymer.

Pre-polymerised reaction mixture is continuously withdrawn from the loop reactor and continuously provided to a plug flow reactor, where it is polymerised further to a degree of conversion of at least 90%. In the plug flow reactor, which is preferably equipped with static mixing elements and/or heat exchange equipment, the polymerisation can be completed up to high conversions. The use of static mixing elements and/or heat exchange equipment in the plug flow reactor provide for further intense mixing and homogeneous temperature distribution. Due to this, the molecular weight distribution, degree of conversion, and residence time distribution can all be tightly controlled. Furthermore, the temperature profile of the reaction along the plug flow reactor can be controlled to a high degree, enabling optimisation of the polymerisation process.

In another preferred embodiment of the process, the process additionally comprises a subsequent devolatization step in which unreacted cyclic oligomer or other volatile components are removed from the polyester polymer composition. Preferably the devolatization step takes place in the molten state using a vacuum and/or a purge of inert atmosphere. Low molecular weight residual species including any unconverted monomeric or oligomeric species present in polyester polymer compositions may lead to discoloration and/or molecular weight degradation during subsequent thermal processing such as extrusion or molding. Low molecular weight residual species may also cause plate-out during molding or even lead to degradation of the mechanical properties of the polyester polymer composition at high concentrations. Although the process of the invention generally has the benefit of high conversion and not producing large quantities of volatile components during the process, nonetheless small amounts may be present as impurities in the cyclic polyester oligomer and/or may form during the ring-opening polymerization step. Therefore these other volatile species, as well as potentially any residual unreacted oligomer of sufficiently low molecular weight, may beneficially be removed by a devolatilization step subsequent to the ring-opening polymerization step. It is noted that one of the advantages of the present invention is that it typically uses fairly high molecular weight cyclic polyester oligomers as reactants, and such high molecular weight species will not tend to give significant problems due to degradation, discoloration, or plate out when remaining unconverted in the final product polymer composition.

In a related preferred embodiment of the process, the devolatilization step takes place in one or more extruders, preferably twin screw extruders, wiped film evaporators, falling film evaporators, rotary devolatilisers, rotary disk devolatilisers, centrifugal devolatilisers, flat plate devolatilisers, static expansion chambers having special distributors, or their combinations. Such devolatilization equipment is effective in removing residual cyclic oligomer and other volatile components from highly viscous polymer melts.

In yet another preferred embodiment of the process, the cyclic polyester oligomer comprising the structure $Y^1$ comprises the specific structure:

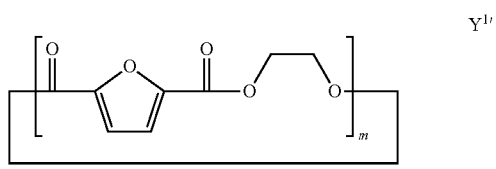

wherein m is as previously defined, and the polyester polymer having furanic units and comprising the structure $Z^1$ comprises the specific structure:

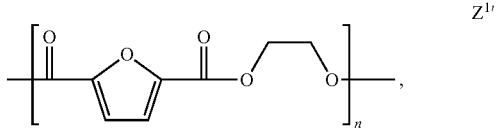

wherein n is as previously defined. This process has the advantage of producing poly(2,5-ethylene furandicarboxylate) (PEF), which is the heterocycle homologue of the most important commercial polyester, poly(ethylene terephthalate) (PET). PEF is currently in pilot-scale development and shows potential as a biobased alternative to PET for packaging and bottle applications.

In an alternative other preferred embodiment of the process, the cyclic polyester oligomer comprising the structure $Y^1$ comprises the specific structure:

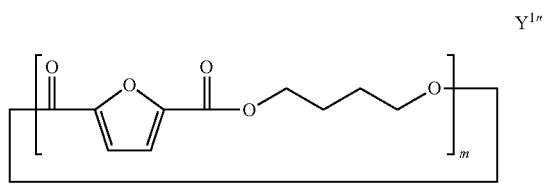

wherein m is as previously defined, and the polyester polymer having furanic units and comprising the structure $Z^1$ comprises the specific structure:

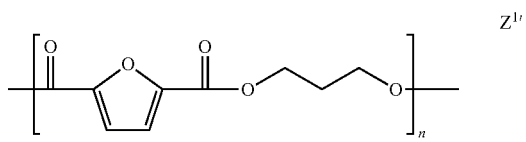

wherein n is as previously defined. This process has the advantage of producing poly(2,5-butylene furandicarboxylate) (PBF), which is the heterocycle homologue of another important commercial polyester, poly(butylene terephthalate) (PBT). PBT has excellent mechanical and electrical properties with robust chemical resistance, and PBF is of interest as a biobased alternative.

Related to these two alternative preferred embodiments of the process and sharing their advantages is a preferred embodiment of the polyester polymer composition wherein either: (A) the polyester polymer having furanic units comprises more specifically the structure Z1' and the cyclic polyester oligomer comprises more specifically the structure Y1', or (B) the polyester polymer having furanic units comprises more specifically the structure Z1" and the cyclic polyester oligomer comprises more specifically the structure Y1".

Another preferred embodiment of the polyester polymer composition of the invention is one where the polyester polymer has a polydispersity of less than 3, preferably 2.5, most preferably 2.1.

Further aspects of the present invention include the use of the polyester polymer composition of the invention in extrusion, injection molding, or blow molding. Such use benefits then from the previously discussed advantages of the composition and the process of the invention.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one process claim may be combined with the subject matter of one or more other process claims or the subject matter of one or more composition claims or the subject matter of a mixture of one or more process claims and composition claims. By analogy, the subject matter of any one composition claim may be combined with the subject matter of one or more other composition claims or the subject matter of one or more process claims or the subject matter of a mixture of one or more process claims and system claims.

One skilled in the art will understand that the combination of the subject matters of the various embodiments of the invention is also possible without limitation in the invention to the extent that such combinations are technically feasible.

BRIEF DESCRIPTION OF THE DRAWINGS

The invention will be explained in more detail hereinafter with reference to various embodiments of the invention as well as to the drawings. The schematic drawings show.

DETAILED DESCRIPTION OF THE INVENTION

The claimed invention relates to a process to prepare a polyester polymer composition comprising a polyester polymer having furanic units, wherein the polyester polymer having furanic units comprises the structure $Z^1$ or $Z^2$:

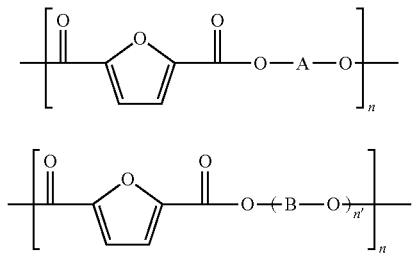

wherein n' is an integer from 1 to 20, preferably 2 to 10, and n is an integer from 10 to 1,000,000.

The polyester polymer composition of the current invention is not specifically limited and it may comprise other components in addition to the polyester polymer having furanic units and comprising the structure $Z^1$ or $Z^2$. For example, the polyester polymer composition may additionally comprise small amounts of one or more unreacted and/or unremoved reaction components such as a cyclic oligomer, a catalyst, a initiator, a catalyst quencher, an endcapping agent, or a solvent. In addition, the polyester polymer composition may additionally comprise low levels of impurities introduced as a contaminant in one of the reaction components or formed due to a side reaction during a ring-opening polymerization step or an optional additional step such as a subsequent devolatization step. Finally the polyester polymer composition may additionally comprise additional components such as typical polymer additives added to polymers during compounding like plasticizers, flow modifiers, release agents, or stabilizers against oxidation, thermal degradation, light or UV radiation. One skilled in the art will understand that blends with other polymers in order to combine the favorable properties of different polymers are also contemplated as being within the scope of the present invention.

One advantage of the polyester polymer composition of the current invention is that in contrast with prior art methods of preparing polyesters, such as the direct reaction of diacid and diol or acidol monomers, the composition of the invention will contain little or no residue of such diacid, diol, or acidol monomers. In one embodiment, the content of diacid, diol, or acidol monomers is less than 1 wt %, preferably less than 0.5 wt %, more preferably less than 0.1 wt %, and most preferably not detectable by FTIR or NMR spectroscopic methods or extraction of soluble species followed by GC-MS or HPLC analysis. In the present application, the content of diacid, diol, or acidol monomers refers to their content as measured by the extraction of soluble species followed by GC-MS analysis.

The process of the invention comprises the step of reacting a cyclic polyester oligomer in the presence of a catalyst in a ring-opening polymerization step under conditions of a reaction temperature and reaction time sufficient to yield the polyester polymer having furanic units and comprising the structure $Z^1$ or $Z^2$.

In one embodiment, the cyclic polyester oligomer comprises the structure $Y^1$

Figure 1:
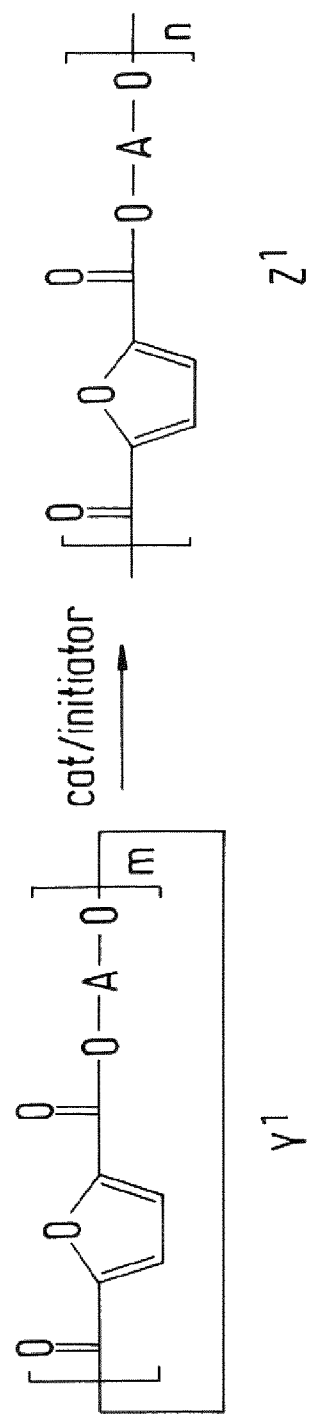
FIG. 1 shows a reaction scheme for the synthesis of a polyester polymer having furanic units and comprising the structure $Z^1$ from a cyclic polyester oligomer $Y^1$.

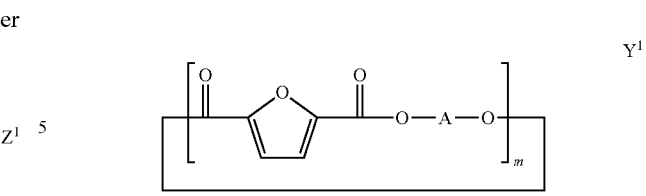

wherein each of the groups A is an optionally-substituted linear, branched or cyclic alkyl, phenyl, aryl, or alkylaryl group, and m is an integer from 1 to 20, preferably 2 to 15, most preferably 3 to 10, and the polyester polymer comprises the structure $Z^1$, wherein A is as previously defined and n is an integer from 10 to 1,000,000, as shown in the reaction scheme in FIG. 1.

In an alternative embodiment, the cyclic polyester oligomer comprises the structure $Y^2$

Figure 2:
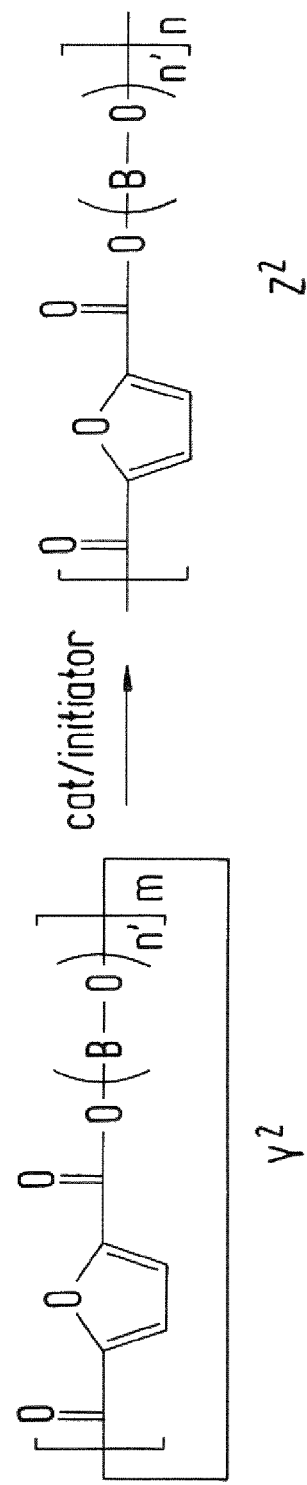
FIG. 2 shows a reaction scheme for the synthesis of a polyester polymer having furanic units and comprising the structure $Z^2$ from a cyclic polyester oligomer $Y^2$.

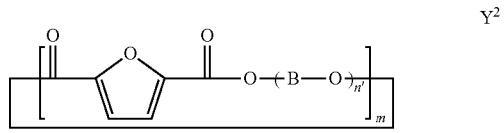

wherein each of the groups B is an optionally-substituted linear, branched or cyclic alkyl, phenyl, aryl, or alkylaryl group, and m is an integer from 1 to 20, preferably 2 to 15, most preferably 3 to 10, and the polyester polymer comprises the structure $Z^2$, wherein B, n' and n are as previously defined, as shown in the reaction scheme in FIG. 2.

Figure 3:
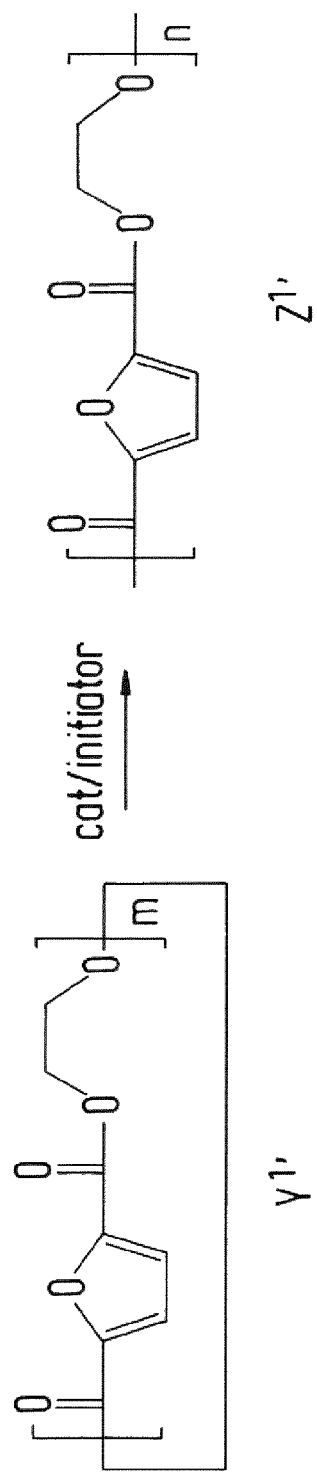
FIG. 3 shows a reaction scheme for the synthesis of a specific polyester polymer having furanic units and comprising the structure $Z^{1'}$ from a cyclic polyester oligomer $Y^{1'}$.
Figure 4:
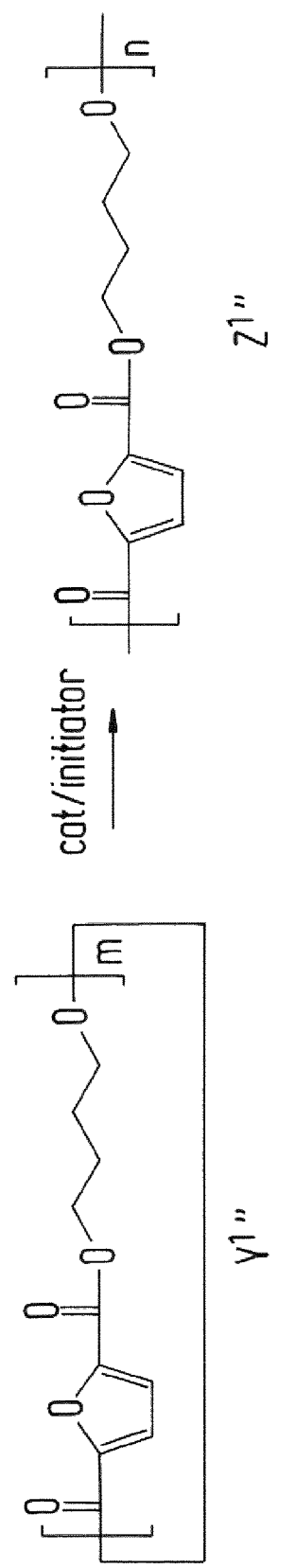
FIG. 4 shows a reaction scheme for the synthesis of a specific polyester polymer having furanic units and comprising the structure $Z^{1''}$ from a cyclic polyester oligomer $Y^{1''}$.

FIG. 3 shows a reaction scheme for the synthesis of a specific polyester polymer having furanic units and comprising the structure $Z^{1''}$ from a cyclic polyester oligomer $Y^{1'}$, and FIG. 4 shows a reaction scheme for the synthesis of a specific polyester polymer having furanic units and comprising the structure $Z^{1'''}$ from a cyclic polyester oligomer $Y^{1''}$, wherein m and n are as previously defined for the case of both figures.

The cyclic polyester oligomer of the current invention is not specifically limited and it may comprise other components in addition to the structures $Y^1$, $Y^2$, $Y^{1'}$, or $Y^{1''}$. For example, the cyclic polyester oligomer may contain low levels of impurities such as linear oligomers, residual catalysts, water, solvent or unreacted diacid, diol, or acidol reagents used in the preparation of the cyclic polyester oligomer. The amount of these impurities in the cyclic polyester oligomer will preferably be less than 10, more preferably less than 5, and most preferably less than 1 mass % based on the total mass of the cyclic polyester oligomer.

Ring opening polymerization processes are well known in the art, for example, as disclosed in Handbook of Ring-Opening Polymerization, by P. Dubois, O. Coulembier, and J.-M. Roquez, Published in 2009 by Wiley-VCH, Weinheim (ISBN 978-3-527-31953-4) or Ring-Opening Polymerization: Kinetics, Mechanisms, and Synthesis, ACS Symposium Series 286, by J. E. McGrath, published in 1985 by ACS (ISBN-13: 978-0894645464).

Unless indicated otherwise, conventional ring-opening polymerization processes and their various reagents, operating parameters and conditions may be used in the processes according to the invention and making use of the cyclic polyester oligomers comprising the structures $Y^1$, $Y^2$, $Y^{1'}$, $Y^{1''}$.

The conditions of a reaction temperature and reaction time sufficient to yield a polyester polymer having furanic units in the ring-opening polymerization step are not specifically limited. Sufficient here means that the reaction temperature and time are sufficient to cause a ring-opening reaction to occur such that a polymer having the claimed values of n is produced from the cyclic oligomers. One skilled in the art will understand that appropriate specific reaction temperatures and reaction times may vary somewhat due to the interaction between the reaction temperature and time.

For example, increasing the reaction temperature may allow the reaction to take place in a shorter time, or increasing the reaction time may allow lower reaction temperatures to be used. Lower reaction temperatures and/or shorter reaction times may be appropriate if a lower molecular weight polyester polymer is to be produced and/or a lower conversion of cyclic polyester oligomer to polymer may be tolerated. Alternatively, higher reaction temperatures and/or longer reaction times may be appropriate if a higher molecular weight polyester polymer is to be produced and/or a higher conversion of cyclic polyester oligomer is desired.

Furthermore the use of more effective catalysts or a higher concentration of catalyst or the use of an optional initiator may allow milder reaction conditions (e.g. lower reaction temperatures and shorter reaction times) to be used. Conversely the presence of impurities, particularly catalyst-quenching or chain-stopping impurities may require more intensive reaction conditions.

In one embodiment the reaction temperature is from 25 to 350, preferably 80 to 300, most preferably 110 to 280° C., and the reaction time is from 10 to 300, preferably, 20 to 240, most preferably 30 to 180 minutes. In certain specific embodiments, the various specific temperature and time range combinations obtained by combining any of these disclosed ranges may be used.

In the execution of the present invention, any catalyst which is able to catalyze the polymerization of a cyclic polyester oligomer into its corresponding polymeric form may be used. Suitable catalysts for use in the present invention are those known in the art for polymerization of cyclic esters, such as a base, preferably a metal alkoxide, or a Lewis acid catalyst. The Lewis acid catalyst may be a metal coordination compound comprising a metal ion having more than one stable oxidation state. Of this class of catalysts, the tin—or zinc—or aluminium—or titanium containing compounds are preferred, of which their alkoxides and carboxylates are more preferred, and tin octoate is the most preferred catalyst. The cyclic polyester oligomer may be in the solid phase when it is mixed with the catalyst. However, bringing the cyclic polyester oligomer into the molten phase and then adding the catalyst afterwards is preferred.

The ring-opening polymerization step preferably takes place in the presence of an optional initiator having at least one or more hydroxyl groups. The initiator is not specifically limited, and, in one embodiment, it is selected from the group consisting of water, 1-octanol, 2-ethylhexanol, 1-decanol, isodecyl alcohol, 1-undecanol, 1-dodecanol, 2-methyl-2-propanol, 4-phenyl-2-butanol, 1,3-propandiol, and pentaerytrol.

Specific combinations of catalysts and initiators have been proven to be particularly effective, and their use is preferred. In one preferred embodiment, the catalyst is a Lewis acid catalyst, preferably a tin or zinc or aluminium or titanium alkoxide or carboxylate, and the initiator is present and it is selected from the group consisting of water, 1-octanol, 2-ethylhexanol, 1-decanol, isodecyl alcohol, 1-undecanol, 1-dodecanol, 2-methyl-2-propanol, 4-phenyl-2-butanol, 1,3-propandiol, and pentaerytrol. In a more specific preferred embodiment, the Lewis acid catalyst is tin octoate and the initiator is either 1-octanol or 2-ethylhexanol.

The amount of catalyst in the process of the invention is not specifically limited. In general, the amount of catalyst is sufficient to cause a ring-opening reaction to occur for the selected reaction temperature and time such that a polymer having the claimed values of n is produced from the cyclic oligomers. In one embodiment, the catalyst is present in an amount relative to the mass of the cyclic polyester oligomer of from 1 ppm to 1 mass %, preferably from 10 to 1,000 ppm, more preferably from 50 to 500 ppm. Similarly the amount of optional initiator is not specifically limited, and in one embodiment the initiator is present in an amount of from 1 to 100, preferably from 10 to 50 mmol per kg cyclic polyester oligomer. The concentration of the catalyst and the initiator may be readily determined by the masses or mass flow rates used of these reagents relative to that of the cyclic polyester oligomer.

The process to prepare the polyester polymer composition of the invention is not specifically limited, and it may be conducted in a batch, semi-continuous, or continuous manner. Polymerisation processes suitable for preparing the polyester polymer composition of the invention can be divided into two groups, viz. polymerisation in the presence of a solvent, e.g., suspension or precipitation or emulsion polymerisation, and polymerisation in the substantial absence of solvent, e.g., melt polymerisation, carried out at a temperature above the melting temperature of the cyclic oligomer and polymer, or mass polymerisation, carried out at a temperature below the melting temperature of the polymer. The latter may be in some embodiments subjected after melt-polymerisation to solid-state post-polymerisation (SSP) in order to increase the average molecular weight to values that are not achievable in the molten state.

The apparatus suitable for carrying out the process of the invention is not specifically limited. For example, batch reactors, continuous stirred tank reactors, plug flow reactors and any combination of them (e.g. cascades of stirred tank reactors) can be used.

In one embodiment, the ring-opening polymerization step takes place in a loop reactor 100 and a plug flow reactor 200, wherein one or both of the reactors 100 and 200 are preferably equipped with static mixing elements and heat transfer equipment. Suitable static mixing elements are described in U.S. Pat. No. 4,314,606 and US2008/0219086. The use of static mixing elements ensures a good homogeneity of the reaction mixture comprising polymerised products in combination with optimal removal of reaction heat provided by the heat transfer equipment.

In such a loop reactor, the added cyclic polyester oligomer and catalyst are intimately mixed with partially-polymerised product that is already present in the reactor. One beneficial result of this is that the rheological behaviour of the reaction mixture only changes gradually within the loop reactor, thus helping control the fluid flow within the reactor.

In the loop reactor, the reaction mixture is pre-polymerised. The degree of conversion in the continuous mixing reactor is generally at least 5 wt. %, more in particular at least 10 wt. %. The degree of conversion may be as high as 40 wt. %, or even 50 wt. %. The degree of conversion is generally below 90 wt. %, more in particular at most 85 wt. %. The degree of conversion is defined as the wt of the linear form polymer relative to that of the wt of the total reaction mixture (e.g. linear form polymer+cyclic form oligomer) expressed in wt %. The optimal degree of conversion aimed for in the continuous mixing reactor will depend, among the other factors, on the viscosity of the reaction mixture.

Pre-polymerised reaction mixture is continuously withdrawn from the loop reactor and continuously provided to a plug flow reactor, where it is preferably polymerised further to a degree of conversion of at least 90%. In the plug flow reactor, which is preferably equipped with static mixing elements and heat transfer equipment, the polymerisation may preferentially be completed up to high conversions. Furthermore intense mixing and homogeneous and controllable temperature distribution enable an optimisation of the polymerisation process.

As the presence of substantial amounts of unreacted cyclic polyester oligomer or other volatile species in the polyester polymer composition may detrimentally affect the mechanical properties and processing behaviour of the polymer composition, the polymer composition is preferably also subjected to a devolatilization step. As noted earlier, due to its relatively high molecular weight, most of the unreacted cyclic polyester oligomer will not be very volatile. Due to its lack of free acid or hydroxyl groups, the presence of unreacted cyclic polyester oligomer will not generally be detrimental to the polymer composition properties. Thus in a preferred embodiment, the process additionally comprises a subsequent devolatilization step in which unreacted cyclic oligomer or preferably other volatile components are removed from the the polyester polymer having furanic units obtained from the ring-opening polymerization step, and preferably where the devolatization step takes place in the molten state using a vacuum and/or a purge of inert atmosphere. In alternative embodiments, unreacted cyclic polyester oligomer or other volatile species may be removed by extraction with suitable solvents or precipitation from solution or treatment by a suitable column or bed.

The devolatilization step is carried out to remove volatiles, in particular liberated monomer species, unreacted reactants, impurities, or degradation products from molten or solid polymer compositions. The volatiles are preferably removed at increased temperature under reduced pressure, e.g. under vacuum, preferably below 10 mbar. Additionally, it is possible to purge by passing an inert gas through the polymer composition in the molten liquid phase.

In the polyester polymer composition product that is obtained after the devolatilisation step, cyclic polyester oligomer is generally present in an amount of less than 2 wt. %, more in particular in an amount of less than 1 wt. %, still more in particular in an amount of less than 0.5 wt. %.

Examples of devolatilisers include extruders, especially twin screw extruders, wiped film evaporators, falling film evaporators, rotary devolatilisers, rotary disk devolatilisers, centrifugal devolatilisers, flat plate devolatilisers, and static expansion chambers involving special distributors, e.g., Sulzer devolatilization technology as described in EP1800724. The use of a static expansion chamber is considered preferred. Devolatilization in various stages and/or a combination of various types of apparatus is also possible. Stripping gas such as nitrogen can be applied to one or several stages in order to facilitate devolatilization. Devolatilization may also be conducted in solid-state post-polymerisation equipment or by drying of solid pelletised polyester polymer composition product under vacuum or inert gas flow, e.g., in a tumble dryer. Optionally, a crystallisation step may be performed before the drying step.

Figure 5:
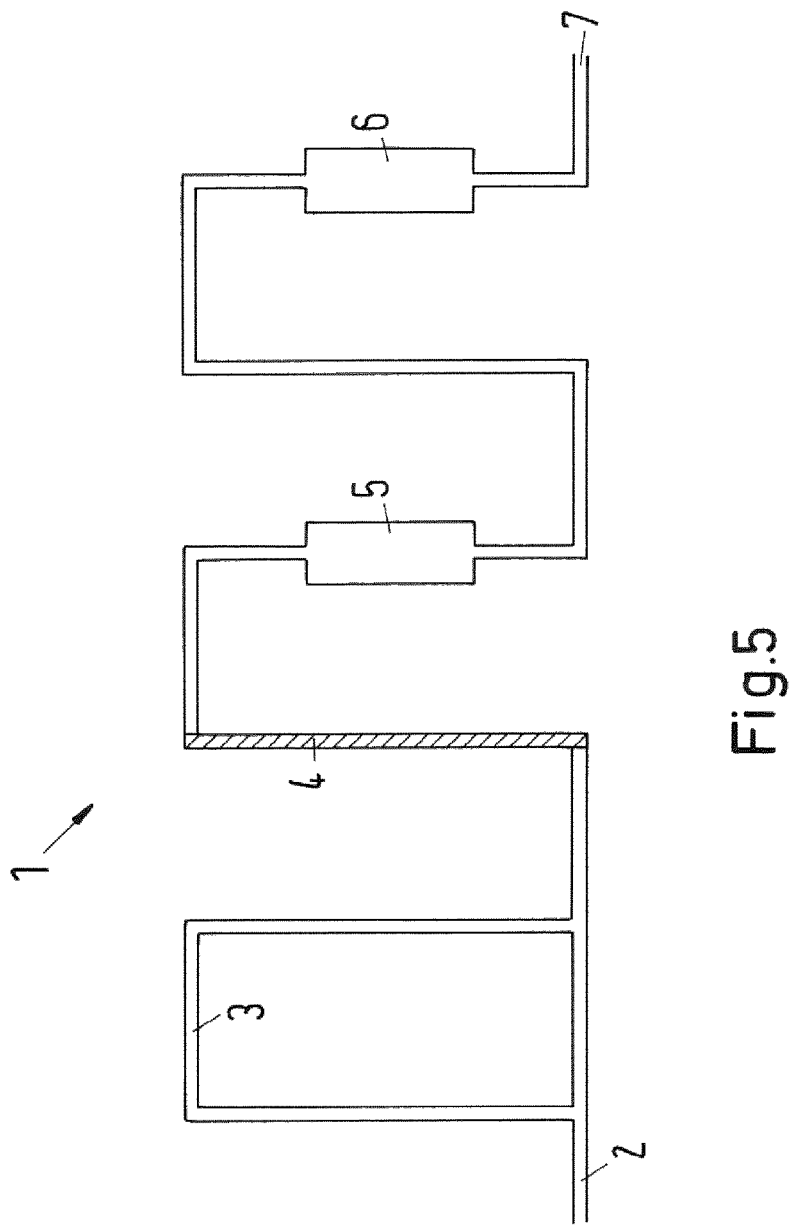
FIG. 5 shows a schematic drawing (not to scale) of an apparatus suitable for performing the process according to the present invention for preparing a polyester polymer composition comprising a polyester polymer having furanic units from the corresponding cyclic polyester oligomer.

FIG. 5 shows a schematic view of a preferred apparatus suitable for the continuous process of preparing high molecular weight polyester polymer compositions in high quality from cyclic polyester oligomers in an economically attractive manner on an industrial scale. In FIG. 5 an embodiment of a continuous polymerization apparatus 1 is depicted, which comprises an inlet 2, a loop reactor 3, a plug flow reactor 4 and a two-stage vacuum devolatilisation unit, containing devolatilisation tanks 5 and 6, and an outlet 7. A continuous polymerization apparatus of this type has been described in more detail in the international patent application with publication number WO2010/012770-A1.

The cyclic polyester oligomer from which a polyester polymer composition should be prepared and a polymerization catalyst are mixed in molten form and added via inlet 2 to the polymerization apparatus. The temperature of the mixture is chosen such that the mixture remains in liquid form. If an initiator having at least one or more hydroxyl groups should be added, they can be introduced in the system at the same position, for example as alcohols. The mixture is transported in a continuous way to and circulated in the loop reactor 3. Part of the partially polymerized mixture is separated from the loop reactor 3 and transported in a continuous manner through the plug flow reactor 4. In some embodiments, the recirculation ratio in the loop will be between 1 and 50, preferably between 2 and 20, more preferable between 2 and 4. In the present application, the term "recirculation ratio" is defined as the ratio between the flowrate in the lower part of the loop reactor and the flowrate of the fresh monomer stream fed to the loop reactor. Reaction conditions (temperature, flow speed, catalyst concentration, etc) are chosen such that the conversion of the cyclic polyester oligomer in the reaction mixture is (almost) complete and close to equilibrium with the corresponding polymer at the end of plug flow reactor 4. Both the loop and the plug flow reactor may be sub-divided into different zones having different temperatures. The polyester polymer composition is then devolatilized in tanks 5 and 6 and removed from the polymerization apparatus 1 via outlet 7.

After removal, the polyester polymer composition may be subjected to secondary operations such as compounding, blending, pelletizing, extrusion, molding, or various combinations of these operations.

The invention relates to a polyester polymer composition comprising a polyester polymer having furanic units, wherein the polyester polymer having furanic units comprises the structure $Z^1$ or $Z^2$, and wherein the polyester polymer composition is obtainable with the above-described method. Said polyester polymer composition is characterized in that the polyester polymer having furanic units has a number average molar mass (Mn) relative to Polystyrene Standards ranging between 10,000 and 10,000,000 g/mol as determined by Gel Permeation Chromatography (GPC, also referred to as Size Exclusion Chromatography). Such polymer can answer most requirements posed by the current applications. The Mn of the polyester polymer composition is preferably at least 30,000, still more preferably at least 50,000 g/mol. The upper limit of the molar mass is not critical to the process according to the invention. Generally it is below 500,000 g/mol, more specifically below 300,000 g/mol.

The polyester polymer composition of the invention additionally comprises a cyclic polyester oligomer comprising either structure $Y^1$ or $Y^2$, preferably in a concentration of less than 5 wt %, more preferably less than 1, more preferably less than 0.5 in the composition. The concentration of the cyclic polyester oligomer in the composition may be determined by analytical methods known in the art, as described earlier.

In a preferred embodiment of the polyester polymer composition, the polyester polymer having furanic units and comprising either structure $Z^1$ or $Z^2$ also has a polydispersity of less than 3, preferably 2.5, most preferably 2.1.

In another preferred embodiment of the composition, either: (A) the polyester polymer having furanic units comprises more specifically the structure Z1' and the cyclic polyester oligomer comprises more specifically the structure Y1', or (B) the polyester polymer having furanic units comprises more specifically the structure Z1" and the cyclic polyester oligomer comprises more specifically the structure Y1".

Yet another aspect of the present invention is the use of the polyester polymer composition of the invention in extrusion, injection molding, or blow molding.

EXAMPLES

The following examples are set forth to provide those of ordinary skill in the art with a detailed description of how the processes, polyester polymer compositions, and uses claimed herein are evaluated, and they are not intended to limit the scope of what the inventors regard as their invention.

In these examples, the following characterization methods and parameters were used for the characterization of the polyester polymer composition prepared in the examples.

$^1$H NMR

Measurements were performed on a Bruker AV 400 spectrometer operating at a frequency of 400 MHz and using d-TFA as solvent.

MALDI-TOF

The matrix was T-2-[3-(4-t-Butyl-phenyl)-2-methyl-2-propenylidene]malononitrile (DCTB)+Na Mix 10:1, and the instrument type was a Bruker Daltonics Ultraflex II, and the acquisition mode was reflector.

DSC

Analysis were performed on a "Mettler Toledo Polymer DSC" or on a "PerkinElmer DSC8000" differential scanning calorimeters, calibrated with indium standard. Standard aluminum pans were used for the analysis.

Example 1: A Polyester Polymer Composition (Embodiment of $Z^{1'}$)

Figure 6:
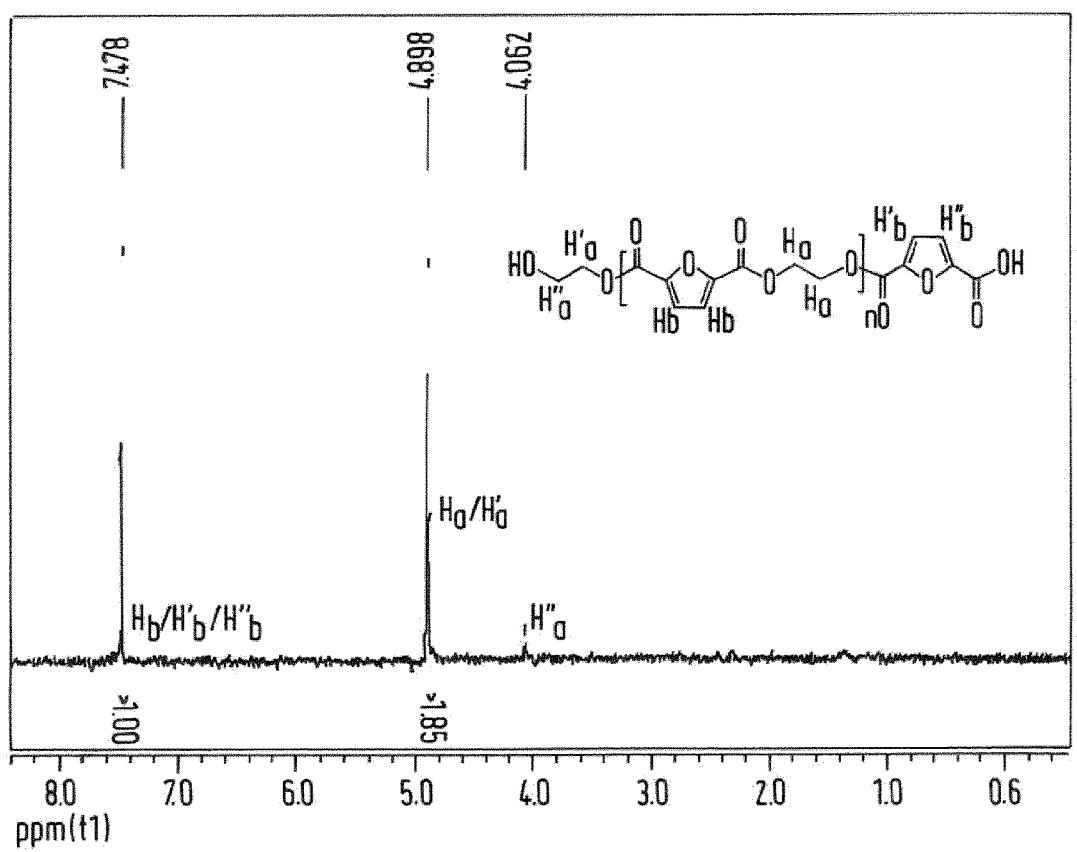
FIG. 6 Example 1: $^1$H NMR spectrum (400 MHz, d-TFA, 25° C.) for Polyester Polymer Composition (Embodiment of $Z^{1'}$).
Figure 7A:
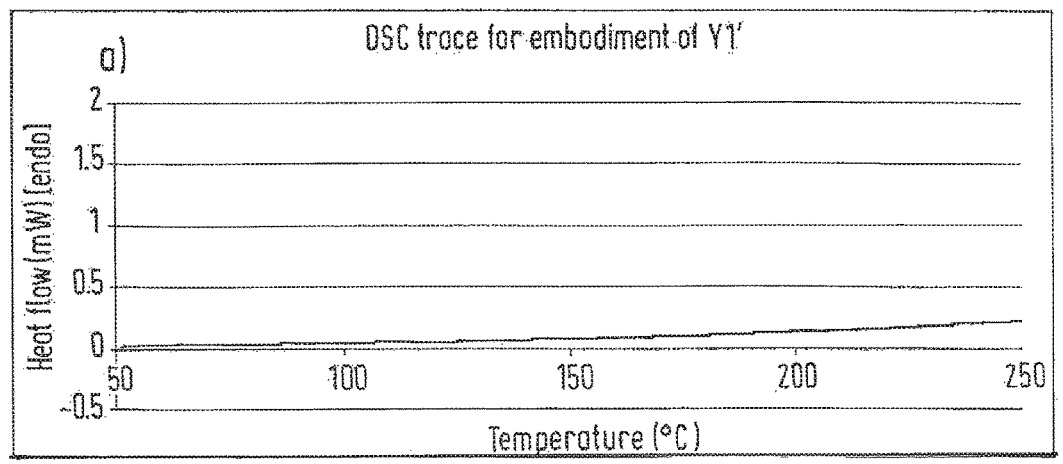
FIG. 7A DSC trace of Example 1 for Cyclic Polyester Oligomer Composition (Embodiment of $Y^{1'}$) in the temperature range between 50 and 250° C. (2nd heating scan)
Figure 7B:
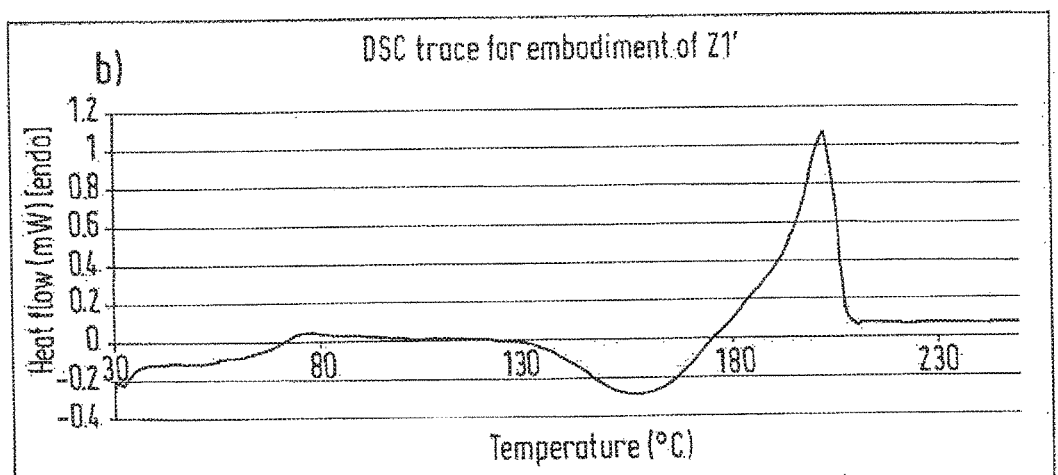
FIG. 7B DSC trace of Example 1 for Polyester Polymer Composition (Embodiment of $Z^{1'}$) in the temperature range between 30 and 250° C. (2nd heating scan).

In this example, the preparation is described of the polyester polymers shown in FIG. 3. The reaction was performed in a Mettler Toledo Polymer DSC. Tetrakis(2-ethylhexyl)titanate was added in 0.1 mol % ratio to a solution of PEF cyclics dissolved in dry tetrahydrofuran (THF). THF was removed by vacuum evaporation, and the resulting solid mixture was transferred into a glove box under nitrogen. 15 mg of the obtained solid were weighted into a 40 uL aluminum DSC pan, which was sealed under inert atmosphere. The pan was heated to 270° C. for 15 minutes in the DSC machine. After 15 minutes the pan was cooled to room temperature, opened, and the solid residue was dissolved in trifluoroacetic acid (TFA). The polyester polymers were precipitated from the solution by addition of THF. The mixture was centrifuged and the supernatant was removed by decantation. The separation procedure was repeated for two more times. The remaining solid residue, which consists of a purified mixture of PEF polyester polymers ($Z^{1'}$), was finally dried under vacuum and analyzed. FIGS. 6 and 7b feature respectively representative $^1$H NMR spectrum and DSC trace for embodiment of $Z^{1'}$ (PEF polyester polymers).

$^1$H NMR (400 MHz, d-TFA, 25° C.): δ=4.06 (H"$_a$), 4.90 (H$_a$+H'$_a$), 7.48 (H$_b$+H'$_b$+H"$_b$) see FIG. 6 for atom labeling; MALDI-TOF-MS: m/z (for HO–[M]$_n$-C (O)C$_4$H$_2$OC(O)OH, with [M]=[C(O)C$_4$H$_2$OC(O)OCH$_2$CH$_2$O]): 1271.45 ([M$_6$+Na]$^+$, calcd for C$_{54}$H$_{40}$O$_{35}$Na$^+$: 1271.13), 1453.53 ([M$_7$+Na]$^+$, calcd for C$_{62}$H$_{46}$O$_{40}$Na$^+$: 1453.15), 1635.56 ([M$_8$+Na]$^+$, calcd for C$_{70}$H$_{52}$O$_{45}$Na$^+$: 1635.17), 1817.56 ([M$_9$+Na]$^+$, calcd for C$_{78}$H$_{58}$O$_{50}$Na$^+$: 1817.19); 1999.54 ([M$_{10}$+Na]$^+$, calcd for C$_{86}$H$_{64}$O$_{55}$Na$^+$: 1999.21), 2181.48 ([M$_{11}$+Na]$^+$, calcd for C$_{94}$H$_{70}$O$_{60}$Na$^+$: 2181.23), 2363.39 ([M$_{12}$+Na]$^+$, calcd for C$_{102}$H$_{76}$O$_{65}$Na$^+$: 2363.25), 2545.29 ([M$_{13}$+Na]$^+$, calcd for C$_{110}$H$_{82}$O$_{70}$Na$^+$: 2545.28), 2728.12 ([M$_{14}$+Na]$^+$, calcd for C$_{118}$H$_{88}$O$_{75}$Na$^+$: 2727.30), 2909.97 ([M$_{15}$+Na]$^+$, calcd for C$_{126}$H$_{94}$O$_{80}$Na$^+$: 2909.32), 3091.80 ([M$_{16}$+Na]$^+$, calcd for C$_{134}$H$_{100}$O$_{85}$Na$^+$: 3093.17), 3273.58 ([M$_{17}$+Na]$^+$, calcd for C$_{142}$H$_{106}$O$_{90}$Na$^+$: 3273.36), 3455.34 ([M$_{18}$+Na]$^+$, calcd for C$_{150}$H$_{112}$O$_{95}$Na$^+$: 3455.38), 3637.14 ([M$_{19}$+Na]$^+$, calcd for C$_{158}$H$_{118}$O$_{100}$Na$^+$: 3637.40), 3818.90 ([M$_{20}$+Na]$^+$, calcd for C$_{166}$H$_{124}$O$_{105}$Na$^+$: 3819.43), 4000.58 ([M$_{21}$+Na]$^+$, calcd for C$_{174}$H$_{130}$O$_{110}$Na$^+$: 4001.45), 4182.29 ([M$_{22}$+Na]$^+$, calcd for C$_{182}$H$_{136}$O$_{115}$Na$^+$: 4183.47); DSC (temperature program: heat from 30 to 250° C. at 10° C./min; cool to −196° C. by direct quenching in liquid nitrogen; equilibrate at 30° C.; heat from 30 to 250° C. at 10° C./min; data taken from 2$^{nd}$ heating scan): Tg=73, T$_{cold\ crystallization}$ (peak)=156, Tm (peak)=203° C.

Example 2: A Polyester Polymer Composition (Embodiment Of $Z^{1''}$)

Figure 8:
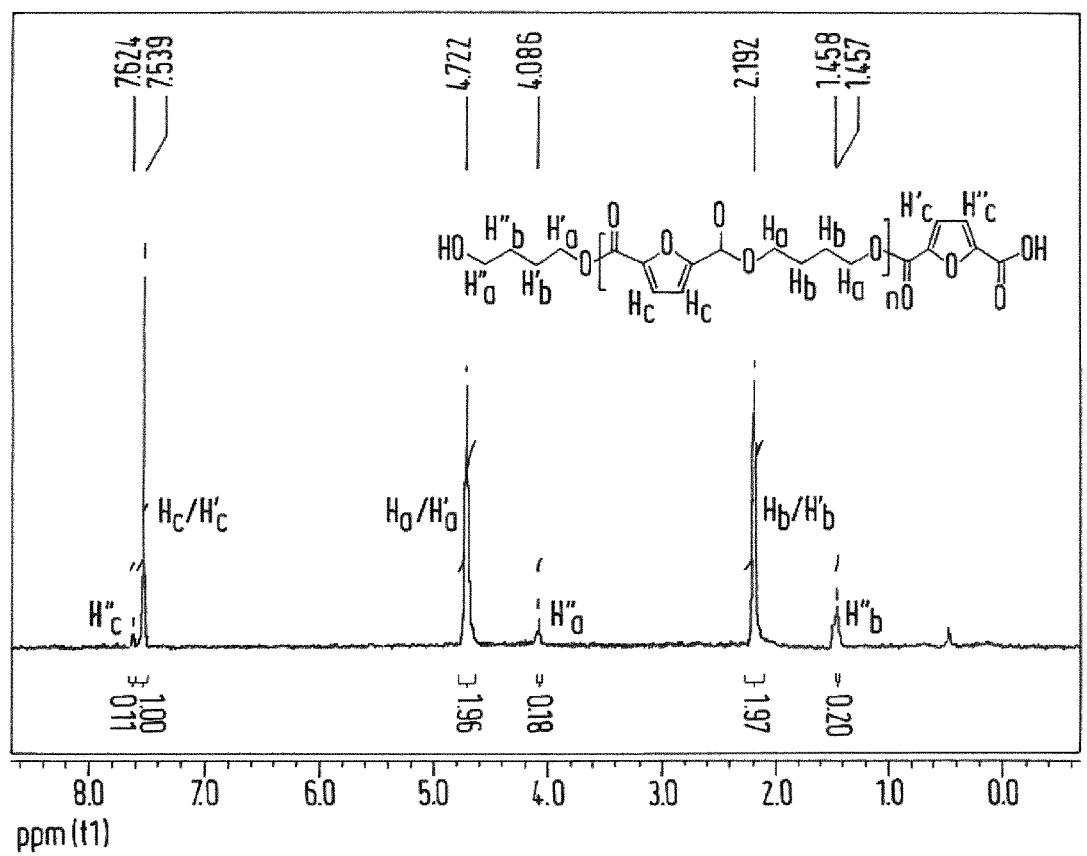
FIG. 8 Example 2: $^1$H NMR spectrum (400 MHz, d-TFA, 25° C.) for Polyester Polymer Composition (Embodiment of $Z^{1''}$).
Figure 9A:
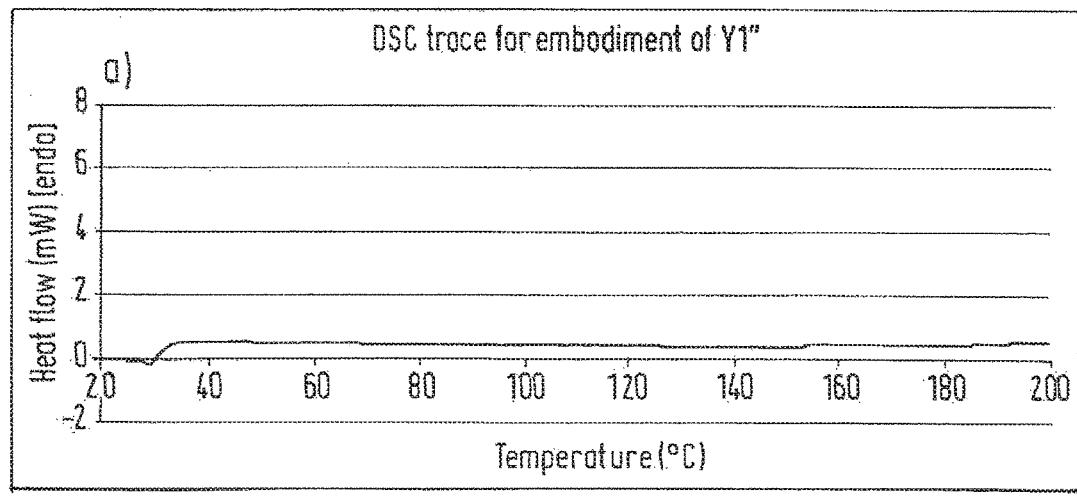
FIG. 9A DSC trace of Example 2 for Cyclic Polyester Oligomer Composition (Embodiment of $Y^{1''}$) in the temperature range between 25 and 200° C. (2nd heating scan)
Figure 9B:
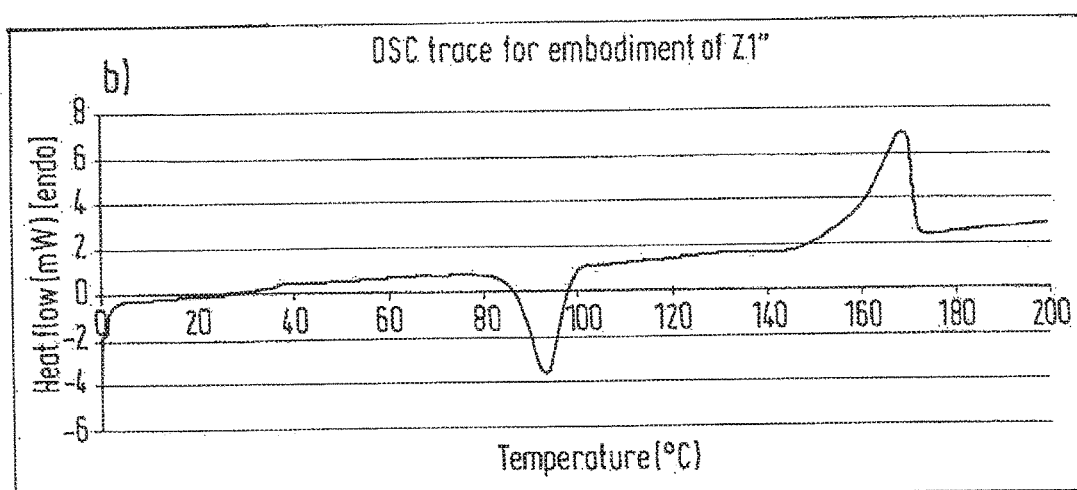
FIG. 9B DSC trace of Example 2 for Polyester Polymer Composition (Embodiment of $Z^{1''}$) in the temperature range between 0 and 200° C. (2nd heating scan).

In this example, the preparation is described of the polyester polymers shown in FIG. 4. The reaction was performed in a Mettler Toledo Polymer DSC. Tetrakis(2-ethylhexyl)titanate was added in 0.1 mol % ratio to a solution of PBF cyclics dissolved in dry THF. THF was removed by vacuum evaporation, and the resulting solid mixture was transferred into a glove box under nitrogen. 15 mg of the obtained solid were weighted into a 40 uL aluminum DSC pan, which was sealed under inert atmosphere. The pan was heated to 270° C. for 15 minutes in the DSC machine. After 15 minutes the pan was cooled to room temperature, opened, and the solid residue was dissolved in trifluoroacetic acid (TFA). The polyester polymers were precipitated from the solution by addition of THF. The mixture was centrifuged and the supernatant was removed by decantation. The separation procedure was repeated for two more times. The remaining solid residue, which consists of a purified mixture of PBF polyester polymers ($Z^{1''}$), was finally dried under vacuum and analyzed. FIGS. 8 and 9b show respectively a typical $^1$H NMR-spectrum and a representative DSC trace for embodiment of $Z^{1''}$ (PBF polyester polymers).

$^1$H NMR (400 MHz, d-TFA, 25° C.): Δ=1.46 (H"$_b$), 2.19 (H$_b$+H'$_b$), 4.09 (H"$_a$), 4.72 (H$_a$+H'$_a$), 7.54 (H$_c$+H'$_c$), 7.62 (H"$_c$) see FIG. 8 for atom labeling; DSC (temperature program: hold for 1 min at 0° C.; heat from 0 to 200° C. at 10.00° C./min; hold for 3 min at 200° C.; cool from 200 to 0° C. at −150.00° C./min; hold for 2 min at 0° C.; heat from 0 to 200° C. at 10.00° C./min; data taken from 2$^{nd}$ heating scan): Tg=36, T$_{cold\ crystallization}$ (peak)=94, Tm (peak)=170° C.

In these additional examples, a series of small-scale oligomerization and polymerization reactions may be carried out in a glass tube reactor. The batch reactor tube may be charged at ambient temperature and pressure with the cyclic polyester oligomer and the catalyst and the optional initiator having one or more hydroxyl groups. After charging, the reactor is sealed shut, and the reactor may be deoxygenated by purging with nitrogen.

The reactor tube may be heated using a sand or oil bath. The ring-opening polymerization may be initiated and carried out by increasing the temperature of the reactor tube stepwise. Preferably the reactor tube will be mixed during the polymerization reaction. After the reaction conditions provide sufficient reaction temperature and reaction time to yield a polyester polymer having furanic units, the polyester polymer product may be removed from the reactor tube and analyzed. Preferably GPC analysis will be used to determine the molecular weight properties of the polyester polymer product, and MALDI analysis may be used to confirm that the cyclic polyester oligomer has been converted to a linear polyester polymer. Compositional information on the polyester polymer, such as concerning the content of any diacid, diol, or acidol monomers or degradation products, may be obtained by NMR, FTIR and/or Raman spectroscopies. The content of such monomers and cyclic polyester oligomers may be determined by extraction of these soluble species followed by GC-MS analysis.

In one set of examples, the polyester polymer having furanic units and comprising the specific structure $Z1'$ may be prepared from the cyclic polyester oligomer comprising the specific structure $Y1'$. In this example, the polyester oligomer is charged to the reactor together with tin octoate as catalyst (500 ppm concentration of catalyst relative to the mass of the cyclic oligomer) and 2-ethylhexanol as initiator (100 mmol per kg cyclic polyester oligomer). The reactor is heated slowly to a temperature of 280° C., and the reactor is maintained at this temperature over a period of several hours. Samples are regularly withdrawn from the reactor at 20 minute intervals and analyzed as described previously. The sample analyses will indicate that the extent of conversion of the cyclic polyester oligomer and the molecular weight of the polyester polymer obtained will progressively increase until at least about 80% conversion is achieved. These analytical data and polymer properties at higher conversions will compare favorably with those of PEF prepared by methods known in art, for example, the data and properties as disclosed in the publication of J. Ma, Y. Pang, M. Wang, J. Xu, H. Ma and X. Nie, in J. Mater. Chem. 2012, 22, 3457-3461. Carrying out such examples as a function of reaction time and temperature will allow one to determine the required reaction temperature and reaction time conditions sufficient to obtain the desired molecular weight and conversion properties for a particular charge of cyclic polyester oligomer and type and concentration of catalyst and initiator.

In another set of examples, the polyester polymer having furanic units and comprising the specific structure $Z1''$ may be prepared from the cyclic polyester oligomer comprising the specific structure $Y1''$ and the required reaction temperature and reaction time conditions sufficient to obtain the desired molecular weight and conversion properties may be determine for a particular charge of cyclic polyester oligomer and type and concentration of catalyst and initiator. These analytical data and polymer properties at higher conversions will compare favorably with those of PBF prepared by methods known in art, for example, the data and properties as disclosed in the publication of J. Ma, Y. Pang, M. Wang, J. Xu, H. Ma and X. Nie, in J. Mater. Chem. 2012, 22, 3457-3461.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A process to prepare a polyester polymer composition comprising a polyester polymer having furanic units, wherein the process comprises the step of:
reacting a cyclic polyester oligomer in the presence of a catalyst in a ring-opening polymerization step under conditions of a reaction temperature and a reaction time sufficient to yield a polyester polymer having furanic units, wherein either: (I) the cyclic polyester oligomer comprises the structure:

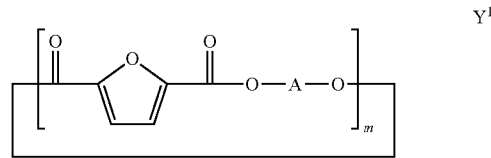

wherein each of the groups A is an optionally-substituted linear, branched or cyclic alkyl, phenyl, aryl, or alkylaryl group, and m is an integer from 1 to 20,
and the polyester polymer having furanic units comprises the structure:

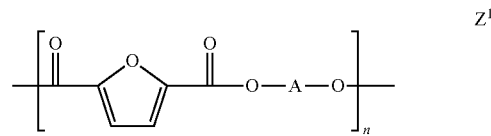

wherein A is as previously defined and n is an integer from 10 to 1,000,000 such that the polyester polymer has a number average molar mass (Mn) relative to Polystyrene Standards ranging between 10,000 and 10,000,000 g/mol as determined by Gel Permeation Chromatography,
or (II) the cyclic polyester oligomer comprises the structure:

wherein each of the groups B is an optionally-substituted linear, branched or cyclic alkyl, phenyl, aryl, or alkylaryl group, and n' is an integer from 1 to 20, and m is as previously defined,
and the polyester polymer having furanic units comprises the structure:

wherein B, n' and n are as previously defined.

2. The process of claim 1, wherein the reaction temperature is from 25 to 350° C., and wherein the reaction time is from 10 to 300 minutes.

3. The process of claim 1, wherein the catalyst is selected from a base, or a Lewis acid catalyst.

4. The process of claim 3, wherein the catalyst is a Lewis acid catalyst, and wherein the initiator is present and it is selected from the group consisting of water, 1-octanol, 2-ethylhexanol, 1-decanol, isodecyl alcohol, 1-undecanol, 1-dodecanol, 2-methyl-2-propanol, 4-phenyl-2-butanol, 1,3-propandiol, and pentaerytrol.

5. The process of claim 4, wherein the Lewis acid catalyst is tin octoate and the initiator is either 1-octanol or 2-ethylhexanol.

6. The process of claim 3, wherein the initiator is present in an amount of from 1 to 100 mmol per kg cyclic polyester oligomer.

7. The process of claim 1, wherein the catalyst is present in an amount relative to the mass of the cyclic polyester oligomer of from 1 ppm to 1 mass %.

8. The process of claim 1, wherein the ring-opening polymerization step takes place in a loop reactor and a plug flow reactor.

9. The process of claim 8, wherein at least one of the loop reactor and the plug flow reactor is equipped with static mixing elements and heat transfer equipment.

10. The process of claim 1, wherein the process additionally comprises a subsequent devolatization step in which unreacted cyclic oligomer or other volatile components are removed from the polyester polymer having furanic units obtained from the ring-opening polymerization step.

11. The process of claim 10, wherein the devolatization step takes place in the molten state using a vacuum and/or a purge of inert atmosphere.

12. The process of claim 11, wherein the devolatilization step takes place in one or more extruders, twin screw extruders, wiped film evaporators, falling film evaporators, rotary devolatilisers, rotary disk devolatilisers, centrifugal devolatilisers, flat plate devolatilisers, static expansion chambers having special distributors, or their combinations.

13. The process of claim 1, wherein either: (A) the cyclic polyester oligomer comprising the structure $Y^1$ comprises the specific structure:

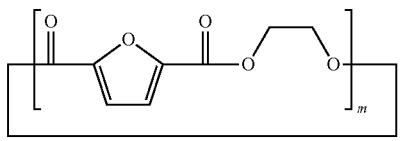

wherein m is as previously defined, and the polyester polymer having furanic units and comprising the structure $Z^1$ comprises the specific structure:

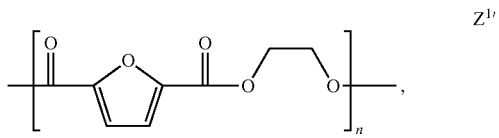

wherein n is as previously defined,
or (B) the cyclic polyester oligomer comprising the structure $Y^1$ comprises the specific structure:

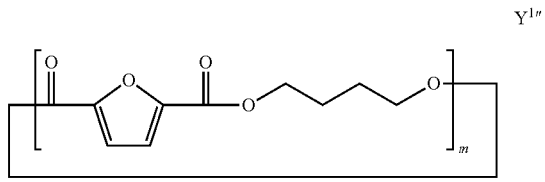

wherein m is as previously defined,
and the polyester polymer having furanic units and comprising the structure $Z^1$ comprises the specific structure:

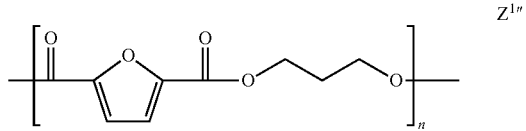

wherein n is as previously defined.

14. The process of claim 1, wherein the ring-opening polymerization step is performed under conditions of a reaction temperature and a reaction time sufficient to yield a polyester polymer having furanic units and a number average molecular weight (Mn) relative to polystyrene standards of at least 30,000 g/mol as determined by Gel Permeation Chromatography.

15. The process of claim 3, wherein the ring-opening polymerization step takes place in the presence of an initiator having at least one or more hydroxyl groups.

* * * * *